US012018623B2

(12) United States Patent
Puri et al.

(10) Patent No.: US 12,018,623 B2
(45) Date of Patent: Jun. 25, 2024

(54) CAM PHASING CONTROL FOR THERMAL MANAGEMENT

(71) Applicant: Cummins Inc., Columbus, IN (US)

(72) Inventors: Anant Puri, Columbus, IN (US); Gregory M. Shaver, Lafayette, IN (US); Jeremy D. Crismore, Columbus, IN (US)

(73) Assignee: Cummins Inc., Columbus, IN (US)

(*) Notice: Subject to any disclaimer, the term of this patent is extended or adjusted under 35 U.S.C. 154(b) by 570 days.

(21) Appl. No.: 16/896,630

(22) Filed: Jun. 9, 2020

(65) Prior Publication Data

US 2020/0362772 A1 Nov. 19, 2020

Related U.S. Application Data

(63) Continuation of application No. PCT/US2018/065667, filed on Dec. 14, 2018.

(60) Provisional application No. 62/598,659, filed on Dec. 14, 2017.

(51) Int. Cl.

| | |
|---|---|
| ***F02D 13/02*** | (2006.01) |
| ***F01L 1/04*** | (2006.01) |
| ***F01L 1/047*** | (2006.01) |
| ***F01L 1/34*** | (2006.01) |
| ***F01L 1/344*** | (2006.01) |
| *F02D 41/00* | (2006.01) |

(52) U.S. Cl.

CPC ............ *F02D 13/0249* (2013.01); *F01L 1/04* (2013.01); *F01L 1/047* (2013.01); *F01L 1/34* (2013.01); *F01L 1/344* (2013.01); *F01L 2820/044* (2013.01); *F02D 2041/001* (2013.01)

(58) Field of Classification Search

None

See application file for complete search history.

(56) References Cited

U.S. PATENT DOCUMENTS

| | | | | |
|---|---|---|---|---|
| 6,948,310 B2 | 9/2005 | Roberts, Jr. et al. | | |
| 7,520,260 B2 | 4/2009 | Nakamura et al. | | |
| 8,505,278 B2 * | 8/2013 | Farrell | F02D 41/0235 | 60/285 |
| 8,899,018 B2 | 12/2014 | Frazier et al. | | |
| 8,954,257 B2 | 2/2015 | Livshiz et al. | | |
| 9,175,628 B2 | 11/2015 | Livshiz et al. | | |
| 2004/0031457 A1 | 2/2004 | Kawamura et al. | | |
| 2006/0130463 A1 * | 6/2006 | Miura | F02D 41/0255 | 60/289 |

(Continued)

FOREIGN PATENT DOCUMENTS

WO WO2014149297 A1 9/2014

OTHER PUBLICATIONS

Search Report and Written Opinion, PCT Appln. No. PCT/U18/065667, 13 pgs. Apr. 24, 2019.

*Primary Examiner* — Wesley G Harris

(74) *Attorney, Agent, or Firm* — Taft, Stettinius & Hollister LLP

(57) ABSTRACT

An internal combustion engine system includes an engine with a plurality of pistons housed in respective ones of a plurality of cylinders, an air intake system to provide air to the plurality of cylinders through respective ones of a plurality of intake valves, an exhaust system to release exhaust gas from the plurality of cylinders through respective one of a plurality of exhaust valves, an aftertreatment system to treat exhaust emission from the engine, and a controller coupled to at least one sensor and configured to control a cam phaser for thermal management of the aftertreatment system.

20 Claims, 5 Drawing Sheets

(56) References Cited

U.S. PATENT DOCUMENTS

| | | | | |
|---|---|---|---|---|
| 2007/0156325 | A1 | 7/2007 | Livshiz et al. | |
| 2007/0186538 | A1 | 8/2007 | Dollmeyer et al. | |
| 2009/0288621 | A1* | 11/2009 | Mikawa | F01L 1/344 123/90.15 |
| 2010/0071656 | A1* | 3/2010 | Freese, V | F02D 41/0245 60/287 |
| 2013/0111905 | A1 | 5/2013 | Pekar et al. | |
| 2014/0137819 | A1 | 5/2014 | McConville et al. | |
| 2015/0211961 | A1* | 7/2015 | Ueno | G01M 15/05 73/114.22 |
| 2015/0240686 | A1* | 8/2015 | Light-Holets | F01N 3/2066 60/274 |
| 2016/0040616 | A1 | 2/2016 | Dickson et al. | |
| 2017/0082055 | A1 | 3/2017 | Cygan, Jr. et al. | |
| 2017/0159578 | A1* | 6/2017 | Moon | F02D 13/0219 |

* cited by examiner

CAM PHASING CONTROL FOR THERMAL MANAGEMENT

CROSS-REFERENCE TO RELATED APPLICATIONS

The present application is a continuation of PCT Patent Application No. PCT/US18/65667 filed on Dec. 14, 2018, which claims the benefit of the filing date of U.S. Provisional Application Ser. No. 62/598,659 filed on Dec. 14, 2017, each of which is incorporated herein by reference in its entirety.

BACKGROUND

The present invention relates to operation of an internal combustion engine system, and more particularly, but not exclusively, relates to using cam phasing for thermal management of one or more aftertreatment components.

Various aftertreatment subsystems have been developed to control exhaust emissions from internal combustion engines. The performance of the engine and its aftertreatment subsystems often varies with their operating temperatures, which has led to the development of various thermal management systems to better manage the temperature conditions of the engine and its aftertreatment subsystem. For example, thermal management of the aftertreatment system and/or engine temperatures can provide operational benefits such as more efficient combustion processes and more effective aftertreatment device operations.

Devices have been developed to assist in managing aftertreatment component temperatures. For example, while turbochargers with variable geometry (VG) inlets have been used to increase exhaust temperatures, VG turbochargers are costlier than wastegated turbochargers. Exhaust heaters can also be used, but are also expensive and require a generator to create energy to run the heater. Exhaust throttles are costly and have reliability concerns. Other strategies such as hydrocarbon (HC) dosing and cylinder deactivation have also been used for thermal management of aftertreatment systems but could be more effective. Unfortunately, these systems can require multiple additional components to implement and therefore increase the cost and complexity of the system. Thus, there is a continuing demand for further contributions in this area of technology.

SUMMARY

Certain embodiments of the present application includes unique systems, methods and apparatus to regulate operation of an internal combustion engine using a cam phaser that is modulated or controlled to increase and/or decrease engine thermal output to provide thermal management of one or more aftertreatment components. Other embodiments include unique apparatus, devices, systems, and methods involving the cam phaser control of an internal combustion engine system to meet a thermal management condition.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF REPRESENTATIVE EMBODIMENTS

Figure 1:
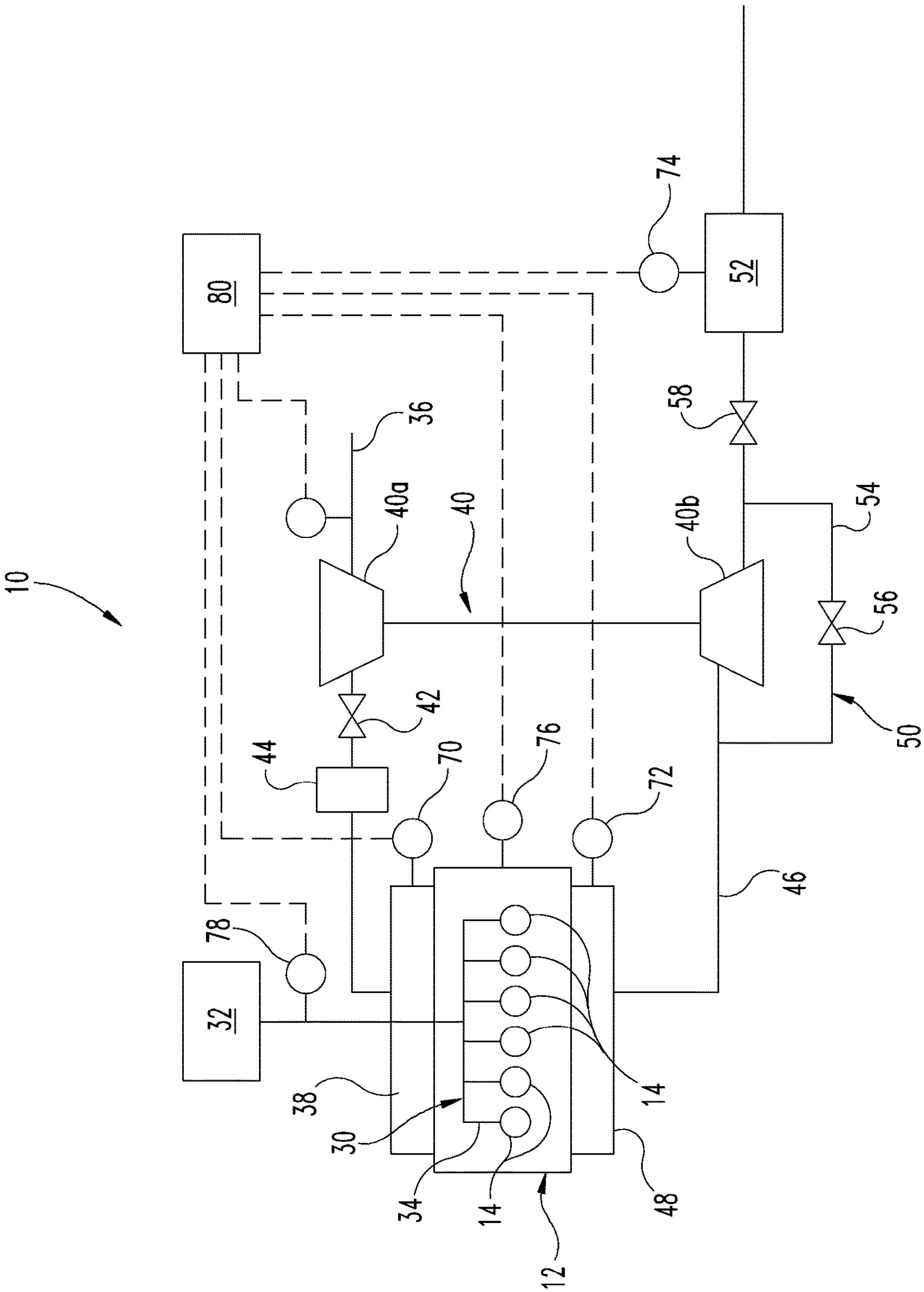
FIG. 1 is a schematic view of one embodiment of an internal combustion engine system operable to provide thermal management for an aftertreatment device using a cam phaser.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

Figure 2:
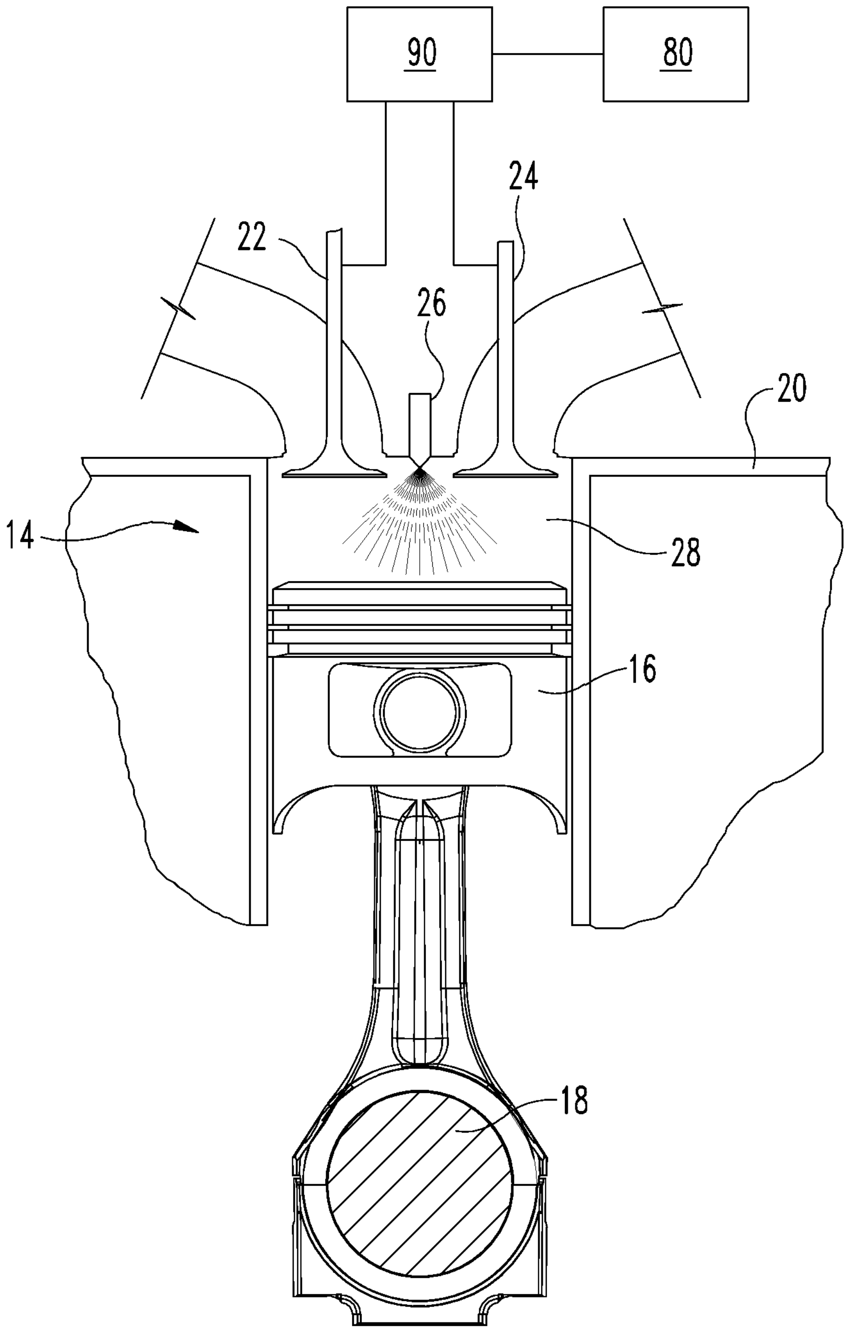
FIG. 2 is a diagrammatic and schematic view of one embodiment of a cylinder of the internal combustion engine system of FIG. 1 and a cam phaser.

With reference to FIGS. 1 and 2, an internal combustion engine system 10 includes a four-stroke internal combustion engine 12. FIG. 1 illustrates an embodiment where the engine 12 is a diesel engine, but any engine type is contemplated, including compression ignition, spark-ignition, and combinations of these. The engine 12 can include a plurality of cylinders 14 that, as discussed further below, are operably connected with a cam phaser 90 (FIG. 2) that adjusts the intake and/or exhaust valve opening and closing timing in response to a cam phaser position command. FIG. 1 illustrates the plurality of cylinders 14 in an arrangement that includes six cylinders 14 in an in-line arrangement for illustration purposes only. Any number of cylinders and any arrangement of the cylinders suitable for use in an internal combustion engine can be utilized. The number of cylinders 14 that can be used can range from one cylinder to eighteen or more. Furthermore, the following description at times will be in reference to one of the cylinders 14. It is to be realized that corresponding features in reference to the cylinder 14 described in FIG. 2 and at other locations herein can be present for all or a subset of the other cylinders 14 of engine 12.

As shown in FIG. 2, the cylinder 14 houses a piston 16 that is operably attached to a crankshaft 18 that is rotated by reciprocal movement of piston 16 in a combustion chamber 28 of the cylinder 14. Within a cylinder head 20 of the cylinder 14, there is at least one intake valve 22, at least one exhaust valve 24, and a fuel injector 26 that provides fuel to the combustion chamber 28 formed by cylinder 14 between the piston 16 and the cylinder head 20. In other embodiments, fuel can be provided to combustion chamber 28 by port injection, or by injection in the intake system, upstream of combustion chamber 28.

The term "four-stroke" herein means the following four strokes—intake, compression, power, and exhaust—that the piston 16 completes during two separate revolutions of the engine's crankshaft 18. A stroke begins either at a top dead center (TDC) when the piston 16 is at the top of cylinder head 20 of the cylinder 14, or at a bottom dead center (BDC), when the piston 16 has reached its lowest point in the cylinder 14.

During the intake stroke, the piston 16 descends away from cylinder head 20 of the cylinder 14 to a bottom (not shown) of the cylinder, thereby reducing the pressure in the combustion chamber 28 of the cylinder 14. In the instance where the engine 12 is a diesel engine, a combustion charge is created in the combustion chamber 28 by an intake of air through the intake valve 22 when the intake valve 22 is opened.

The fuel from the fuel injector 26 is supplied by a high pressure common-rail system 30 (FIG. 1) that is connected to the fuel tank 32. Fuel from the fuel tank 32 is suctioned by a fuel pump (not shown) and fed to the common-rail fuel system 30. The fuel fed from the fuel pump is accumulated in the common-rail fuel system 30, and the accumulated fuel is supplied to the fuel injector 26 of each cylinder 14 through a fuel line 34. The accumulated fuel in common rail system can be pressurized to boost and control the fuel pressure of the fuel delivered to combustion chamber 28 of each cylinder 14.

During the compression stroke in certain modes of operation, both the intake valve 22 and the exhaust valve 24 are closed. The piston 16 returns toward TDC and fuel is injected near TDC in the compressed air in a main injection event, and the compressed fuel-air mixture ignites in the combustion chamber 28 after a short delay. In the instance where the engine 12 is a diesel engine, this results in the combustion charge being ignited. The ignition of the air and fuel causes a rapid increase in pressure in the combustion chamber 28, which is applied to the piston 16 during its power stroke toward the BDC. Combustion phasing in combustion chamber 28 is calibrated so that the increase in pressure in combustion chamber 28 pushes piston 16, providing a net positive in the force/work/power of piston 16.

During the exhaust stroke, the piston 16 is returned toward TDC while the exhaust valve 24 is open. This action discharges the burnt products of the combustion of the fuel in the combustion chamber 28 and expels the spent fuel-air mixture (exhaust gas) out through the exhaust valve 24. As discussed further below, the cam phaser 90 can be adjusted to change the crank angle at which the exhaust valve 24 is opened and closed to vary the thermal output from engine 12 into the exhaust system.

The intake air flows through an intake passage 36 and intake manifold 38 before reaching the intake valve 22. The intake passage 36 may be connected to a compressor 40*a* of a turbocharger 40 and an optional intake air throttle 42. The intake air can be purified by an air cleaner (not shown), compressed by the compressor 40*a* and then aspirated into the combustion chamber 28 through the intake air throttle 42. The intake air throttle 42 can be controlled to influence the air flow into the cylinder.

The intake passage 36 can be further provided with a cooler 44 that is provided downstream of the compressor 40*a*. In one example, the cooler 44 can be a charge air cooler (CAC). In this example, the compressor 40*a* can increase the temperature and pressure of the intake air, while the CAC 44 can increase a charge density and provide more air to the cylinders. In another example, the cooler 44 can be a low temperature aftercooler (LTA). The CAC 44 uses air as the cooling media, while the LTA uses coolant as the cooling media.

The exhaust gas flows out from the combustion chamber 28 into an exhaust passage 46 from an exhaust manifold 48 that connects the cylinders 14 to the exhaust passage 46. The exhaust passage 46 is connected to a turbine 40*b* and a wastegate 50 of the turbocharger 40 and then into an aftertreatment system 52. The exhaust gas that is discharged from the combustion chamber 28 drives the turbine 40*b* to rotate. The wastegate 50 is a device that enables part of the exhaust gas to by-pass the turbine 40*b* through a passageway 54. Less exhaust gas energy is thereby available to the turbine 40*b*, leading to less power transfer to the compressor 40*a*. Typically, this leads to reduced intake air pressure rise across the compressor 40*a* and lower intake air density/flow. The wastegate 50 can include a control valve 56 that can be an open/closed (two position) type of valve, or a full authority valve allowing control over the amount of by-pass flow, or anything between. The exhaust passage 46 can further or alternatively include an exhaust throttle 58 for adjusting the flow of the exhaust gas through the exhaust passage 46. The exhaust gas, which can be a combination of by-passed and turbine flow, then enters the aftertreatment system 52.

Optionally, a part of the exhaust gas can be recirculated into the intake system via an EGR passage (not shown.) The EGR passage can be connected to the exhaust passage 46 upstream of the turbine 40*b* and to the intake passage 36 downstream of the intake air throttle 42. Alternatively or additionally, a low pressure EGR system (not shown) can be provided downstream of turbine 40*b* and upstream of compressor 40*a*. An EGR valve can be provided for regulating the EGR flow through the EGR passage. The EGR passage can be further provided with an EGR cooler and a bypass around the EGR cooler.

The aftertreatment system 52 may include one or more devices useful for handling and/or removing material from exhaust gas that may be harmful constituents, including carbon monoxide, nitric oxide, nitrogen dioxide, hydrocarbons, and/or soot in the exhaust gas. In some examples, the aftertreatment system 52 can include at least one of a catalytic device and a particulate matter filter. The catalytic device can be a diesel oxidation catalyst (DOC) device, ammonia oxidation (AMOX) catalyst device, a selective catalytic reduction (SCR) device, three-way catalyst (TWC), lean NOX trap (LNT) etc. The reduction catalyst can include any suitable reduction catalysts, for example, a urea selective reduction catalyst. The particulate matter filter can be a diesel particulate filter (DPF), a partial flow particulate filter (PFF), etc. A PFF functions to capture the particulate matter in a portion of the flow; in contrast the entire exhaust gas volume passes through the particulate filter.

The arrangement of the components in the aftertreatment system 52 can be any arrangement that is suitable for use with the engine 12. For example, in one embodiment, a DOC and a DPF are provided upstream of a SCR device. In one example, a reductant delivery device is provided between the DPF and the SCR device for injecting a reductant into the exhaust gas upstream of SCR device. The reductant can be urea, diesel exhaust fluid, or any suitable reductant injected in liquid and/or gaseous form.

A controller 80 is provided to receive data as input from various sensors, and send command signals as output to various actuators. Some of the various sensors and actuators that may be employed are described in detail below. The controller 80 can include, for example, a processor, a memory, a clock, and an input/output (I/O) interface.

The system 10 may include various sensors such as an intake manifold pressure/temperature sensor 70, an exhaust manifold pressure/temperature sensor 72, one or more after-treatment sensors 74 (such as a differential pressure sensor, temperature sensor(s), pressure sensor(s), constituent sensor(s)), engine sensors 76 (which can detect the air/fuel ratio of the air/fuel mixture supplied to the combustion chamber, a crank angle, the rotation speed of the crankshaft, an engine load, etc.), and a fuel sensor 78 to detect the fuel pressure and/or other properties of the fuel, common rail 38 and/or fuel injector 26. Any other sensors known in the art for an engine system are also contemplated, and one or more of the sensors can be a physical sensor or a virtual sensor.

System 10 can also include various actuators for opening and closing the intake valves 22, for opening and closing the exhaust valves 24, for injecting fuel from the fuel injector 26, for opening and closing the wastegate valve 56, for the intake air throttle 42, and/or for the exhaust throttle 58. The actuators are not illustrated in FIG. 1, but one skilled in the art would know how to implement the mechanism needed for each of the components to perform the intended function. Furthermore, in one embodiment, the actuators for opening and closing the intake and exhaust valves 22, 24 is operably connected to a cam phaser 90, such as shown in FIG. 3.

Figure 3:
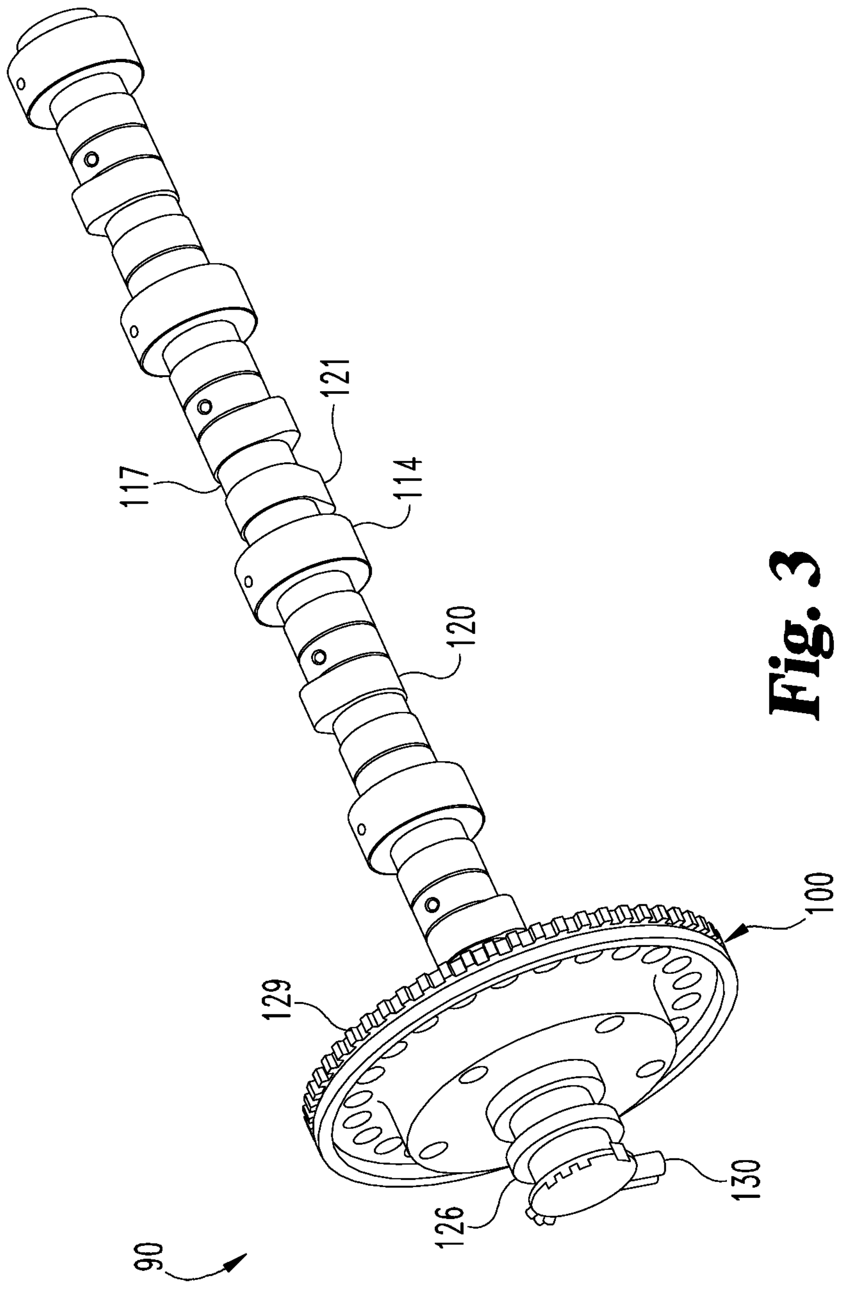
FIG. 3 is a perspective view of one embodiment of a cam phaser connected to a camshaft for opening and closing the intake and exhaust valves of the cylinder in FIG. 2.

Referring further to FIG. 3, further details regarding one embodiment of cam phaser 90 is shown. Cam phaser 90 can adjust a relative positioning and timing of the intake and/or exhaust valve opening and closing during a thermal management mode of operation to, for example, increase an exhaust gas temperature for thermal management of one or more components of the aftertreatment system 52.

As depicted in FIG. 3, cam phaser 90 is shown with a valve train assembly that utilizes a concentric camshaft constructed of intake camshaft lobe(s) 121, exhaust camshaft lobe(s) 120, and camshaft bearings 114. The camshaft may also include concentrically arranged tubes including an outer tube 117, and an inner tube or shaft (not shown), coupled to respective ones of the intake camshaft lobe(s) 121 and the exhaust camshaft lobe(s) 120. The intake camshaft lobe(s) 121 and the exhaust camshaft lobe(s) 120 are followed by rocker levers that actuate the intake and exhaust valves 22, 24 accordingly.

The cam phaser 90 can be used to control the phase angle of the exhaust camshaft lobes(s) 120 independently of the intake camshaft lobe(s) 121. In one embodiment, the intake camshaft lobe(s) 121 are not phased and remain in sync with the engine's traditional camshaft drive mechanism. Described another way, in one embodiment the outer tube 117 is at a fixed and constant phase angle with the engine's traditional camshaft drive mechanism while the inner tube or shaft can vary in phase angle with respect to the engine's traditional camshaft drive mechanism. In another embodiment, the intake camshaft lobe(s) 121 are phased and can vary in phase angle with the engine's traditional camshaft drive mechanism.

Cam phaser 90 may include a front camshaft bearing 126 and a first actuator 130 that is configured to adjust a phase angle of the exhaust camshaft lobe(s) 120. A phase angle of the intake camshaft lobe 121 can also be adjusted with a second actuator in another embodiment (not shown.) A concentric camshaft drive gear 129 is connected to the engine crankshaft 18 (FIG. 2) and is driven at a specified and constant drive ratio. The concentric camshaft drive gear 129 also serves as the housing for the vane plates of the exhaust camshaft phaser and the intake camshaft phaser if provided.

During a thermal management mode of operation, the first actuator 130 is configured to selectively vary the phase angle of the exhaust camshaft lobe(s) 120 to vary the timing at which the exhaust camshaft lobe(s) 120 provide an earlier opening and closing of the exhaust valve(s) 24 on demand during the exhaust stroke of the piston 16. In another embodiment, during a thermal management mode of operation, the second actuator is also configured to selectively vary the phase angle of the intake camshaft lobe(s) 121 to vary the timing at which the intake camshaft lobe(s) 121 open and close the intake valve(s) 22 on demand during the intake stroke of the piston 16.

Figure 4:
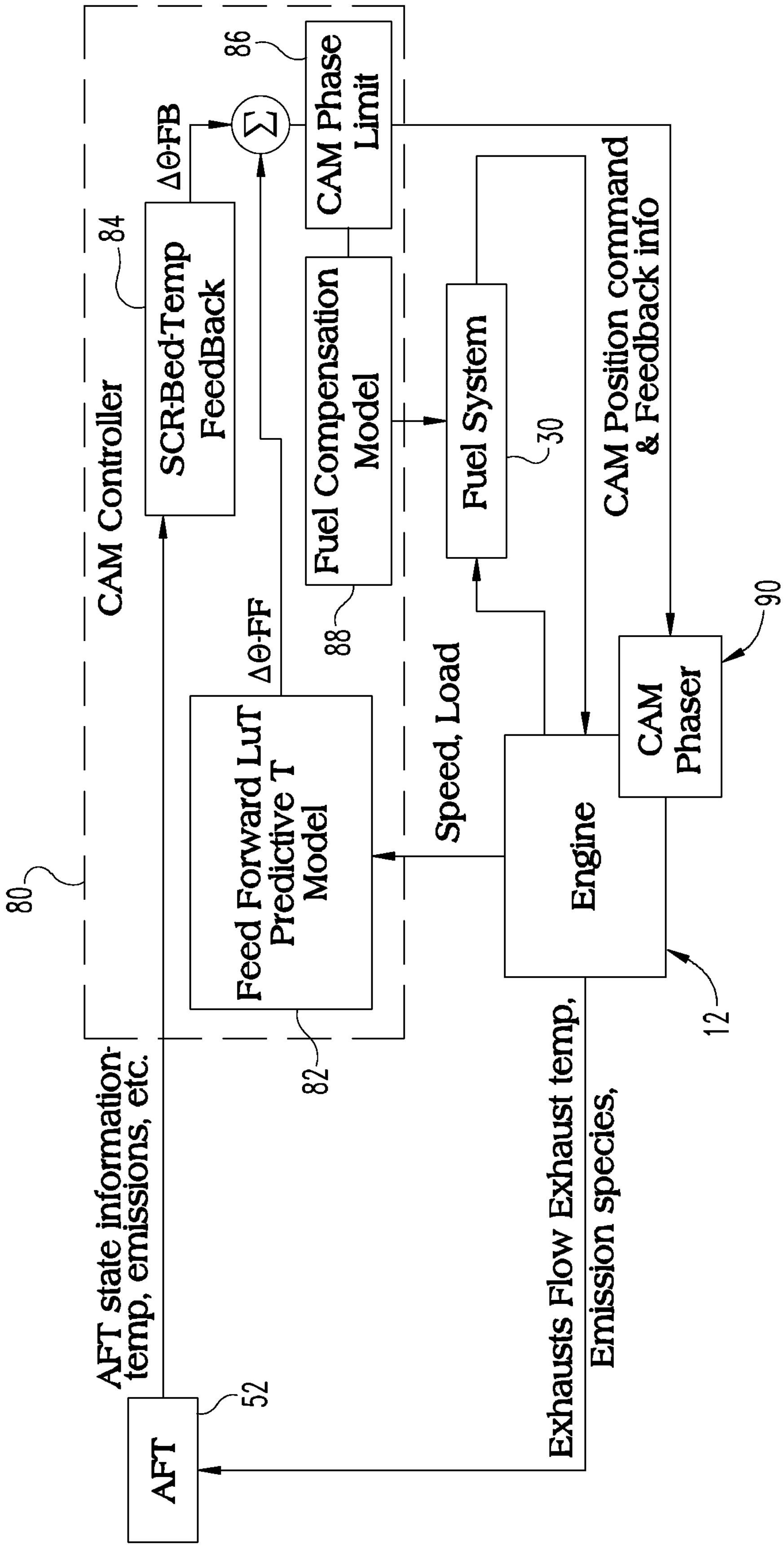
FIG. 4 is a schematic illustration of the engine and one embodiment of a controller for controlling a cam phase position in response to a thermal management condition.

Referring to FIG. 4, a schematic diagram of one embodiment of a controller 80 for cam phasing to provide thermal management of one or more of devices of aftertreatment system 52 is provided. The controller 80 includes a feedforward module 82 that is configured to provide a feedforward look-up table based cam phase reference value for the cam phase position and, in certain embodiments, a predictive temperature model to augment the feedforward cam phase reference value, to thermally manage the aftertreatment system 52. Controller 80 is configured to, for example, output a cam phaser position command that controls a position of the cam phaser 90 to adjust the exhaust valve opening and closing timing (and intake valve opening and closing timing in certain embodiments) to enable aftertreatment system 52 to achieve a desired conversion efficiency over the cycle. The cam phaser position command helps aftertreatment system 52 achieve a required temperature for the desired conversion efficiency while providing the required exhaust flow, to heat the aftertreatment system 52 to the desired temperature as quickly as possible without sacrificing performance objectives, and maintain a temperature of the aftertreatment system 52 at or above a desired temperature.

Controller 80 includes a feedforward module 82 that has a speed/load based lookup table (LuT) that provides a feed-forward cam phase reference value ΔΘ-FF for the phase angle change. The feed-forward cam phase reference value ΔΘ-FF is associated with an aftertreatment device temperature feedback cam reference value ΔΘ-FB generated by feedback module 84 using error on the aftertreatment device temperature. The feed-forward cam phase reference value ΔΘ-FF can be calibrated with cam phase angles which do not violate mechanical and emission limits for engine 12 and at the same time are targeting a certain aftertreatment device temperature.

Controller 80 also includes a cam phase limit module 86 downstream of the output of the associated feed-forward cam phase reference value ΔΘ-FF and feedback cam reference value ΔΘ-FB to apply limits to the cam phase angle position change provided by the cam position command to the cam phaser 90. Aggressive cam phase angle changes can lead to issues with regard to performance, emission and mechanical limits. Hence there is a requirement to put a limit on the final cam phase change value coming from the association of the feedforward and feedback reference values. For example, the final cam phase change value can be limited to maintain the torque drop to be within acceptable limits (e.g. 5%), to maintain the turbine inlet temperature below a maximum value (e.g. 750° C.), to maintain a turbo speed above a minimum threshold, to maintain an air-fuel ratio above a minimum value to, for example, avoid smoke issues, to maintain the PCP below a recommended limit, to maintain an intake manifold temperature below a maximum temperature threshold, and to maintain emission constraints, such as those associated with particulate matter and hydrocarbons. The cam position change value is also provided to a fuel compensation module 88, which is discussed further below.

In another embodiment of controller 80, the feedforward module 82 includes a predictive temperature model. The implementation of the predictive temperature model increases system response by determining a predicted aftertreatment device temperature as an input for feedback by looking at future temperature trends of the aftertreatment system 52 or devices thereof and improve the closed loop response time of controller 80. One example model is a thermal resistivity model that predicts the mid-bed temperature of the aftertreatment device based on its inlet temperature and the outlet temperature of an upstream component, along with the temperature resistance, length, cross-sectional area and conductivity of the aftertreatment device. Other embodiments contemplate any other suitable predictive temperature model.

Figure 5:
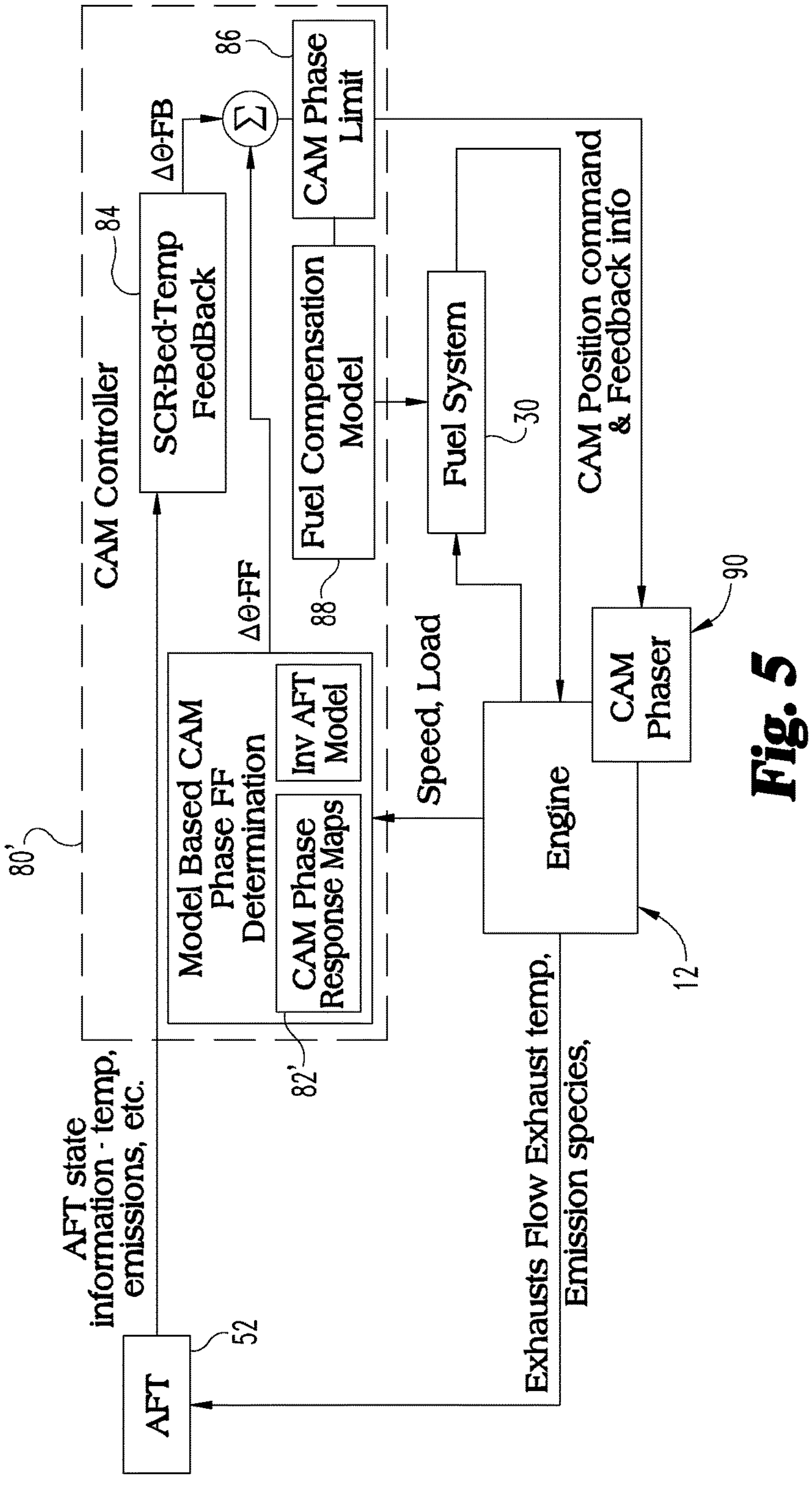
FIG. 5 is a schematic illustration of the engine and another embodiment of a controller for controlling a cam phase position in response to a thermal management condition and FIG. 5A is one embodiment aftertreatment system model.

Referring to FIG. 5, there is shown another embodiment controller 80' that is similar to controller 80. However, controller 80' includes a feedforward module 82' that employs a model-based feedforward determination of the cam phase reference value ΔΘ-FF. In one embodiment, the model is a model of the aftertreatment system and the parameters affected by cam phasing, such as a turbine outlet temperature and the exhaust flow.

In one embodiment of the feedforward module 82' there is provided an inverted aftertreatment temperature model to assist in determining the feedforward cam phase reference value ΔΘ-FF. In one specific embodiment, the aftertreatment system 52, whether or not it includes multiple components, is modeled as a single, lumped device so that, given a target temperature of the aftertreatment system 52, a turbine outlet temperature target can be determined using model inversion. The feedforward cam phase reference value ΔΘ-FF can then be determined for the turbine outlet temperature target at the given engine operating speed/load.

It has been discovered by the inventors that the increase in the turbine outlet temperature in response to a cam phase change dominates the effect on exhaust energy much more so than the drop in exhaust flow. Therefore, in one embodiment the aftertreatment temperature model can be simplified to omit the physics of the changes in the exhaust flow and determine the feedforward cam phase reference value ΔΘ-FF based on turbine outlet temperature as follows:

$$\mathrm{TOT}=C_3\theta^2+C_2\theta+C_1 \tag{1}$$

In equation (1) C1, C2, and C3 are regression coefficients. The regression coefficients C1, C2, and C3 can be variable or constant. The regression coefficients C1, C2, and C3 can be determined from a look up table of engine speed/torque, or can be a single value for an entire engine operating space.

The temperature error of the aftertreatment system 52 is the difference between the target temperature and the actual temperature of the targeted device. In an example where the targeted aftertreatment device is an SCR catalyst, the temperature error can be modeled as:

$$\dot{T}_1=-k_1\dot{m}T_1+k_l\dot{m}\times(\mathrm{TOT}) \tag{2}$$

In equation (2), replace $$\dot{T}_1 \text{ with Terror}=T_{SCR\_Target\_Temp}-T_{SCR\_Bed\_Temp} \tag{3}$$

$$\mathrm{TOT}=C_3\theta^2+C_2\theta+C_1 \tag{4}$$

T1 is the temperature of the aftertreatment device, ṁ is the exhaust mass flow and assumed to be constant with turbine outlet temperature TOT being a non-linear function. Both parameters ṁ and TOT are looked up from response maps as a function of engine speed/torque, and solving for θ to get quadratic equation with terms:

$$\dot{T}_1=-k_1\dot{m}T_1+k_1\dot{m}\times(C_3\theta^2+C_2\theta+C_1) \tag{5}$$

This gives following solution for the feedforward cam phase reference value ΔΘ-FF:

$$\theta=\frac{-C_2+\sqrt{\mathrm{abs}\left(C_2^2-4C_3\left(C_1-T_{error}\frac{c}{k\dot{m}}-T_1\right)\right)}}{2C_3} \tag{6}$$

In another embodiment, the aftertreatment temperature model is a second order thermal lumped sum parameter model to provide higher fidelity by modeling the turbine outlet temperature and the exhaust flow in a linear manner. The lumped sum parameter model allows the temperature change to be estimated through the following equations $$\dot{T}_1=-k_1\dot{m}T_1+k_1\dot{m}\times(\mathrm{TOT}) \tag{7}$$

$$\dot{T}_2=k_2\dot{m}T_1-k_2\dot{m}T_2 \tag{8}$$

Figure 5A:
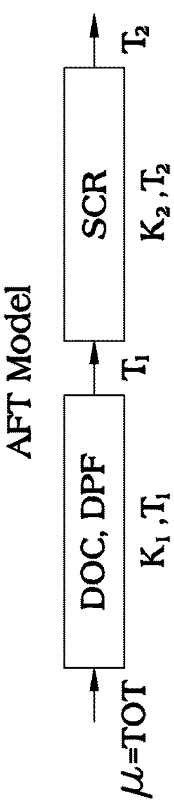

In equations (7) and (8), the variables are shown in FIG. 5A. The aftertreatment system 52 in this model is assumed to include an oxidation catalyst DOC and particulate filter DPF lumped together with coefficient K1 and temperature T1, and the SCR catalyst includes a coefficient K2 and temperature T2. Instead of modelling the turbine outlet temperature (TOT) as a non-linear 2nd order function, both the TOT and mass flow dynamics are modelled in a linear way.

In equation (7) replace, $\dot{T}_1$ with $T_{Target}-T_{DOC}$ or $T_{error}$, replace ṁ with $\overline{m}$+Δmθ, and TOT with $\overline{\mathrm{TOT}}$+ΔTOTθ. A quadratic equation includes the following terms:

$$A=\Delta TOT*\Delta m \tag{9}$$

$$B=\Delta TOT\overline{m}+\Delta m(\overline{TOT}-T_1) \tag{10}$$

$$C=\overline{m}\overline{TOT}-\overline{m}T_1-\frac{T_{error}}{k_1} \tag{11}$$

Solving for theta θ can include solving the quadratic equation since both mass flow and TOT have been modeled as linear functions:

$$\dot{T}_1=+k_1\dot{m}T_1+k_1\dot{m}\times(\mathrm{TOT}) \tag{12}$$

After substituting for TOT=$\overline{\mathrm{TOT}}$+ΔTOTθ & ṁ=$\overline{m}$+Δmθ:

$$\dot{T}_1=-k_1(\overline{m}+\Delta\dot{m}\theta)T_1+k_1\dot{m}\times(\overline{\mathrm{TOT}}+\Delta\mathrm{TOT}\theta) \tag{13}$$

This is a quadratic equation in θ, and can be solved to find a value for θ.

In one embodiment of the feedforward module 82' there is also provided cam phase response maps to assist in determining the feedforward cam phase reference value ΔΘ-FF. The cam phase response maps are based on engine speed/load and provide lookup data for a minimum cam phase angle change and a maximum cam phase angle change. The lookup data from the cam phase response maps can include a base temperature and a change in temperature for the various cam phase changes based on engine speed/load, and a base exhaust flow and a change in exhaust flow for the various cam phase changes based on engine speed/load. Changes in fuel consumption values and emissions values can also be determined for the various cam phase changes shown in the cam phase response maps. Based on this information, the feedforward module 82' can determine an optimal cam position to meet the thermal request for the aftertreatment system 52 in the quickest time.

Controller 80, 80' can further include a fuel compensation module 88. Cam phasing creates potential drivability issues since cam phasing impacts pumping mean effective pressure and gross indicated mean effective pressure, requiring a different fuel rate to maintain the same torque at a given speed/load at different cam phase positions. The fuel compensation module outputs a fuel compensation factor that is applied to the normalized fueling command with no cam phasing. The fuel compensation factors can be developed at various engine speeds/loads/cam positions by capturing the extra gain of fueling required over baseline fueling with no cam phasing. The compensation factor can be determined by formula or by a lookup table.

With cam phasing, there is gas entrapment in the form of internal EGR inside the cylinder due to early exhaust valve closing, which leads to higher pumping torque loss. Pumping torque estimation is used to formulate fueling tables during engine calibration process. The cam phaser position adds another dimension at each engine speed/load operating point to change pumping load. Therefore, a new pumping torque estimation model is contemplated for engines using the cam phasing actuation disclosed herein, where the pumping torque P_Trq is a function of engine speed EngSpd, exhaust manifold pressure EMP, intake manifold pressure IMP, and cam phaser position as follows:

$$P\_\,\mathrm{Trq}=f\{\mathrm{EngSpd,EMP,IMP,CAM\_Position}\} \quad (13)$$

In another embodiment of controller 80', the feedforward cam phase reference value ΔΘ-FF is determined via an optimization technique, such as a Lyapunov control based strategy. This is only one of the controller approaches for optimal CAM position generation and is not limited to a specific optimization technique. For example, any relevant optimization technique can be utilized on the simplified aftertreatment models discussed herein. In addition, the cost functions can include other targets like emission limits, BSFC minimization, performance factors, etc.

The control procedures implemented by the controller 80 (and 80') can be executed by a processor of controller 80 executing program instructions (algorithms) stored in the memory of the controller 80. The descriptions herein can be implemented with internal combustion engine system 10. In certain embodiments, the internal combustion engine system 10 further includes a controller 80 structured or configured to perform certain operations to control internal combustion engine system 10 in achieving one or more target conditions such as a cam phaser position. In certain embodiments, the controller forms a portion of a processing subsystem including one or more computing devices having memory, processing, and communication hardware. The controller may be a single device or a distributed device, and the functions of the controller 80 may be performed by hardware and/or by instructions encoded on a computer readable medium.

In certain embodiments, the controller 80 includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on a non-transient computer readable storage medium, and modules may be distributed across various hardware or other computer components.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

Various aspects of the present disclosure are contemplated. For example, in one aspect a method includes operating an internal combustion engine system including an internal combustion engine with a plurality of cylinders that receive a charge flow from an intake system. The internal combustion engine system further includes an exhaust system for receiving exhaust gas produced by combustion of a fuel provided to at least a portion of the plurality of cylinders from a fueling system, and at least one aftertreatment device in the exhaust system. The method further includes, in response to a thermal management condition associated with the at least one aftertreatment device, determining a phase angle change for a cam shaft that controls an exhaust valve opening and an exhaust valve closing of one or more of the plurality of cylinders to adjust a thermal output of the engine; and changing the phase angle of the cam shaft based on the phase angle change.

In one embodiment, the method includes changing the phase angle by operating a cam phaser connected to an engine cam lobe to advance or retard the exhaust valve opening and the exhaust valve closing. In another embodiment, the method includes limiting the phase angle change based on at least one of: a torque drop limit, a maximum turbine inlet temperature, a minimum turbo speed, a minimum air-fuel ratio, a maximum intake manifold temperature, and one or more emission constraints. In yet another embodiment, the method includes determining a fueling compensation factor in response to the phase angle change and modifying a fueling amount provided to the plurality of cylinders based on the fueling compensation factor.

In another embodiment, the method includes determining a feedforward cam phase reference angle in response to at least one of a speed and a load of the internal combustion engine and a feedback cam phase reference angle in response to the thermal management condition. The phase angle change is based on the feedforward cam phase reference angle and the feedback cam phase reference angle. In a refinement of this embodiment, the feedback cam phase reference angle is determined in response to a temperature difference between a target temperature and a measured temperature of the at least one aftertreatment device. In another refinement of this embodiment, the feedforward cam phase reference angle is determined from a look-up table based on the speed/load of the engine. The feedforward cam phase reference angle may further be based on a predictive temperature model of the at least one aftertreatment device. In another refinement, the feedforward cam phase reference angle is determined from a model-based cam phase change determination that is based on an exhaust mass flow and an exhaust outlet temperature upstream of the at least one aftertreatment device.

According to another aspect, a system includes an internal combustion engine including a plurality of cylinders that receive a charge flow from an intake system, an exhaust system for receiving exhaust gas produced by combustion of a fuel provided to at least a portion of the plurality of cylinders from a fueling system, and an aftertreatment device in the exhaust system. The system also includes a plurality of sensors operable to provide signals indicating operating conditions of the system and a cam phaser to control an opening and closing timing of exhaust valves associated with the plurality of cylinders. The system further includes a controller connected to the plurality of sensors operable to interpret one or more signals from the plurality of sensors. The controller, in response to a thermal management condition of the aftertreatment device based on the one or more signals, is configured to change a phase angle of the cam phaser at a given engine speed to change a timing of at least one of an exhaust valve opening and an exhaust valve closing of one or more of the plurality of cylinders.

In one embodiment, the controller is configured to determine the change in phase angle for the cam phaser in response to a feedforward cam phase reference angle that is based on a speed or load of the internal combustion and a feedback cam phase reference angle that is based on a temperature condition of the aftertreatment device. In a refinement of this embodiment, the temperature condition is a difference between a target temperature and an actual temperature of the aftertreatment device. In another refinement, the controller includes a look-up table for determining the feedforward cam phase reference angle based on the speed/load of the engine. In yet a further refinement, the feedforward cam phase reference angle is further based on a predictive temperature model of the at least one aftertreatment device. In another refinement, the controller is configured to determine the feedforward cam phase reference angle from a model-based cam phase change determination that is based on an exhaust mass flow and an exhaust outlet temperature upstream of the at least one aftertreatment device.

In another aspect, an apparatus includes a controller for connection to a plurality of sensors configured to interpret signals from the plurality of sensors associated with operation of an internal combustion engine. The controller is configured to provide a cam phaser position command to vary a thermal output of the internal combustion engine at a given engine speed that changes a phase angle of a cam phaser to modulate a timing of an exhaust valve opening and an exhaust valve closing during an exhaust stroke of the internal combustion engine in response to a thermal management condition of an aftertreatment device that is based on one or more signals from one or more of the plurality of sensors.

In one embodiment, the cam phaser position command is determined in response to an association of a feedforward cam phase reference angle based on a speed/load of the engine and a feedback cam phase reference angle based on a temperature condition of the aftertreatment device. In another embodiment, the controller is configured to limit the phase angle change based on at least one of: a torque drop limit, a maximum turbine inlet temperature, a minimum turbo speed, a minimum air-fuel ratio, a maximum intake manifold temperature, and one or more emission constraints. In yet another embodiment, the controller is configured to determine a fueling compensation factor in response to the phase angle change and modifying a fueling amount based on the fueling compensation factor. In still another embodiment, the controller is further configured to estimate a pumping torque of the engine as a function of engine speed, exhaust manifold pressure, intake manifold pressure, and cam phaser position.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as “a,” “an,” “at least one,” or “at least one portion” are used there is no intention to limit the claim to only one item unless specifically stated to the contrary in the claim. When the language “at least a portion” and/or “a portion” is used the item can include a portion and/or the entire item unless specifically stated to the contrary.

What is claimed is:

1. A method, comprising:

operating an internal combustion engine system including an internal combustion engine with a plurality of cylinders that receive a charge flow from an intake system, the internal combustion engine system further including an exhaust system with at least one aftertreatment device for receiving exhaust gas produced by combustion of a fuel provided to at least a portion of the plurality of cylinders from a fueling system;

in response to a thermal management condition associated with the at least one aftertreatment device, determining a phase angle change for a cam shaft that controls an exhaust valve opening and/or an exhaust valve closing of one or more of the plurality of cylinders to adjust a thermal output of the engine, wherein the phase angle change is based on a feedforward cam phase reference value determined from a lookup table or a model, a feedback cam phase reference value based on a temperature error for the at least one aftertreatment device, and one or more limits applied to an output determined from the feedforward cam phase reference value and the feedback cam phase reference value; and changing a phase angle of the cam shaft based on the phase angle change.

2. The method of claim 1, wherein changing the phase angle includes operating a cam phaser connected to an engine cam lobe to advance and/or retard the exhaust valve opening and the exhaust valve closing.

3. The method of claim 1, further comprising determining the feedforward cam phase reference value in response to a speed and a load of the internal combustion engine.

4. The method of claim 3, wherein the feedforward cam phase reference value is determined from a look-up table based on the speed/load of the engine.

5. The method of claim 4, wherein the feedforward cam phase reference value is further based on a predictive temperature model of the at least one aftertreatment device.

6. The method of claim 1, wherein the feedforward cam phase reference value is determined from a model-based cam phase change determination that is based on an exhaust mass flow and an exhaust outlet temperature upstream of the at least one aftertreatment device.

7. The method of claim 6, wherein the exhaust outlet temperature upstream of the at least one aftertreatment device is a turbine outlet temperature.

8. The method of claim 1, wherein the one or more limits to the feedforward cam phase reference value and the feedback cam phase reference value are based on at least one of: a torque drop limit, a maximum turbine inlet temperature, a minimum turbo speed, a minimum air-fuel ratio, and a maximum intake manifold temperature.

9. The method of claim 1, further comprising determining a fueling compensation factor that captures an extra gain in fueling over baseline fueling with no cam phasing to maintain an engine torque in response to the phase angle change and modifying a fueling amount provided to the plurality of cylinders based on the fueling compensation factor.

10. An internal combustion engine system, comprising:

an internal combustion engine including a plurality of cylinders that receive a charge flow from an intake system, an exhaust system with an aftertreatment device configured to receive exhaust gas produced by combustion of a fuel provided to at least a portion of the plurality of cylinders from a fueling system;

a plurality of sensors operable to provide signals indicating operating conditions of the internal combustion engine system;

a cam phaser to control an opening and/or closing timing of exhaust valves associated with the plurality of cylinders; and a controller connected to the plurality of sensors operable to interpret one or more signals from the plurality of sensors, wherein the controller, in response to a thermal management condition of the aftertreatment device based on the one or more signals, is configured to change a phase angle of the cam phaser at a given engine speed to change a timing of at least one of an exhaust valve opening and an exhaust valve closing of one or more of the plurality of cylinders, wherein the controller is configured to determine the change in phase angle for the cam phaser based on a feedforward cam phase reference value determined from a lookup table or model, a feedback cam phase reference value based on a temperature error for the aftertreatment device, and one or more limits applied to an output determined from the feedforward cam phase reference value and the feedback cam phase reference value.

11. The internal combustion engine system of claim 10, wherein the change in phase angle for the cam phaser based on the feedforward cam phase reference value is based on a speed or load of the internal combustion engine.

12. The internal combustion engine system of claim 11, wherein the temperature error is a difference between a target temperature and an actual temperature of the aftertreatment device.

13. The internal combustion engine system of claim 11, wherein the controller includes a look-up table for determining the feedforward cam phase reference value based on the speed/load of the internal combustion engine.

14. The internal combustion engine system of claim 13, wherein the feedforward cam phase reference value is further based on a predictive temperature model of the aftertreatment device.

15. The internal combustion engine system of claim 11, wherein the controller is configured to determine the feedforward cam phase reference value from a model-based cam phase change determination that is based on an exhaust mass flow and an exhaust outlet temperature upstream of the aftertreatment device, wherein the exhaust outlet temperature upstream of the aftertreatment device is a turbine outlet temperature.

16. An apparatus for thermal management of an aftertreatment device, comprising:

a controller for connection to a plurality of sensors configured to interpret signals from the plurality of sensors associated with operation of an internal combustion engine, wherein the controller is configured to provide a cam phaser position command to vary a thermal output of the internal combustion engine at a given engine speed that changes a phase angle of a cam phaser to modulate a timing of an exhaust valve opening and an exhaust valve closing during an exhaust stroke of the internal combustion engine in response to a thermal management condition of the aftertreatment device that is based on one or more signals from one or more of the plurality of sensors, wherein the controller is configured to determine the cam phaser position command for the change in phase angle for the cam phaser in response to a feedforward cam phase reference value determined from a lookup table or a model, a feedback cam phase reference value based on a temperature error for the aftertreatment device, and one or more limits applied to an output determined from the feedforward cam phase reference value and the feedback cam phase reference value.

17. The apparatus of claim 16, wherein the cam phaser position command is determined from the feedforward cam phase reference value with a speed/load of the engine and the feedback cam phase reference value based on the temperature error for the aftertreatment device, and the controller is configured to determine the feedforward cam phase reference value from a model-based cam phase change determination that is based on an exhaust mass flow and an exhaust outlet temperature upstream of the aftertreatment device, wherein the exhaust outlet temperature upstream of the aftertreatment device is a turbine outlet temperature.

18. The apparatus of claim 16, wherein the controller is configured to limit the change in phase angle based on at least one of: a torque drop limit, a maximum turbine inlet temperature, a minimum turbo speed, a minimum air-fuel ratio, and a maximum intake manifold temperature.

19. The apparatus of claim 16, wherein the controller is configured to determine a fueling compensation factor that captures an extra gain in fueling over baseline fueling with no cam phasing to maintain an engine torque in response to the change in phase angle and modifying a fueling amount based on the fueling compensation factor.

20. The apparatus of claim 16, wherein the controller is further configured to estimate a pumping torque of the engine as a function of engine speed, exhaust manifold pressure, intake manifold pressure, and cam phaser position.

* * * * *